United States Patent
Sugimura et al.

(10) Patent No.: US 7,703,916 B2
(45) Date of Patent: *Apr. 27, 2010

(54) POLARIZING PLATE WITH MELANIN

(76) Inventors: Hideyo Sugimura, 1 Gadwall La., North Oaks, MN (US) 55127; Xuzhi Qin, 2417 Kiska Ave., Hacienda Heights, CA (US) 91745; Michael S. Boulineau, 431 1$^{st}$ Ave. NW., Forest Lake, MN (US) 55025

( * ) Notice: Subject to any disclaimer, the term of this patent is extended or adjusted under 35 U.S.C. 154(b) by 0 days.

This patent is subject to a terminal disclaimer.

(21) Appl. No.: 12/037,856

(22) Filed: Feb. 26, 2008

(65) Prior Publication Data

US 2008/0144176 A1    Jun. 19, 2008

Related U.S. Application Data

(63) Continuation of application No. 11/207,373, filed on Aug. 18, 2005, now Pat. No. 7,354,150.

(60) Provisional application No. 60/602,841, filed on Aug. 18, 2004.

(51) Int. Cl.
G02C 7/10    (2006.01)

(52) U.S. Cl. .................... 351/163; 351/49; 351/177; 351/44; 264/1.32

(58) Field of Classification Search ............... 351/163
See application file for complete search history.

(56) References Cited

U.S. PATENT DOCUMENTS

| | | | |
|---|---|---|---|
| 4,564,545 A | 1/1986 | Okumura et al. |
| 4,698,374 A | 10/1987 | Gallas |
| 4,774,141 A | 9/1988 | Matsui et al. |
| 4,803,014 A | 2/1989 | Okumura et al. |
| 4,824,882 A | 4/1989 | Nakamura et al. |
| 4,859,039 A | 8/1989 | Okumura et al. |
| 4,895,677 A | 1/1990 | Okumura et al. |
| 4,921,949 A | 5/1990 | Lang et al. |
| 4,992,218 A | 2/1991 | Sugio et al. |
| 5,036,115 A | 7/1991 | Gallas |
| 5,047,447 A | 9/1991 | Gallas |
| 5,059,356 A | 10/1991 | Nakamura et al. |
| 5,071,234 A | 12/1991 | Amano et al. |
| 5,112,883 A | 5/1992 | Gallas |
| 5,157,075 A | 10/1992 | Kanai et al. |
| 5,216,116 A | 6/1993 | Pawelek |
| 5,218,079 A | 6/1993 | Pawelek et al. |
| 5,225,435 A | 7/1993 | Pawelek et al. |
| 5,227,459 A | 7/1993 | Pawelek et al. |
| 5,286,418 A | 2/1994 | Nakamura et al. |
| 5,286,419 A | 2/1994 | van Ligten et al. |
| 5,326,507 A | 7/1994 | Starzewski |
| 5,354,513 A | 10/1994 | Nakamura et al. |
| 5,384,116 A | 1/1995 | Pawelek et al. |
| 5,618,519 A | 4/1997 | Pawelek et al. |
| 5,666,223 A | 9/1997 | Bennett et al. |
| 5,738,803 A | 4/1998 | Shepherd et al. |
| 5,746,949 A | 5/1998 | Shen et al. |
| 6,103,777 A | 8/2000 | Krishnan et al. |
| 6,328,446 B1 | 12/2001 | Bhalakia et al. |
| 6,761,452 B2 | 7/2004 | Moravec et al. |
| 6,797,383 B2 | 9/2004 | Nishizawa et al. |
| 6,886,937 B2 | 5/2005 | Moravec et al. |
| 6,900,937 B2 | 5/2005 | Saiki et al. |
| 7,004,583 B2 | 2/2006 | Miniutti et al. |
| 7,036,932 B2 | 5/2006 | Boulineau et al. |
| 7,354,150 B2* | 4/2008 | Sugimura et al. ............ 351/163 |
| 2004/0233350 A1* | 11/2004 | Kawanishi et al. ............ 349/96 |
| 2005/0020806 A1 | 1/2005 | Toyoshima et al. |
| 2005/0225715 A1* | 10/2005 | Kopfer ........................ 351/62 |

* cited by examiner

*Primary Examiner*—Jessica T Stultz
(74) *Attorney, Agent, or Firm*—Inskeep IP Group, Inc.

(57) ABSTRACT

The present invention is directed to the incorporation of melanin in an optical article with polarization properties. Such an article includes a first polymer layer containing a polarizing agent, a second polymer layer containing melanin and wherein the second polymer layer is disposed upon the first polymer layer.

17 Claims, No Drawings

POLARIZING PLATE WITH MELANIN

RELATED APPLICATIONS

This application is a continuation of application Ser. No. 11/207,373, filed on Aug. 18, 2005, entitled Polarizing Plate With Melanin, now U.S. Pat. No. 7,354,150, which claims priority to U.S. Provisional Patent Application No. 60/602,841 entitled Polarizing Plate With Melanin filed Aug. 18, 2004, the entire contents of which are hereby incorporated by reference.

FIELD OF THE INVENTION

The current invention relates to a polarizing plate containing melanin not sharing the same host layer. The present invention further relates to a process to make the polarizing plate, and its use in optical articles, including ski goggles, sunscreen lenses, and ophthalmic lenses.

BACKGROUND OF THE INVENTION

Melanin is known for its use as a pigment to provide a naturally appearing tan and a sunscreen to mammalian skin and hair. In recent years, increased attention has been given to the application of melanin for providing full spectrum (ultraviolet, visible and near infrared) absorption properties to protective eye wear. Ordinary eyewear lenses only cut off the ultraviolet radiation below 400 nm. It is believed that the high-energy visible (HEV), which is the radiation in the range of wavelength between 400 nm and 550 nm, causes photochemical damage to the retina. The amount and severity of the damage increases exponentially as the wavelength of the radiation decreases towards 400 nm. Melanin is effective in blocking HEV.

The application of melanin as absorbing pigment against radiation emitted by artificial and natural light sources is specifically disclosed in a series of U.S. Pat. Nos. 4,698,374, 5,036,115, 5,047,447, and 5,112,883.

The use of a polarizing plate containing melanin in making sunlight protection eyewear has received much attention recently, due to the additional elimination of HEV light by melanin. U.S. patent application Ser. No. 10/207,307 describes a melanin-containing polarizing plate, in which melanin shares the same host layer as the polarization element. Usually, a polyvinyl alcohol (PVA) type polymer is used as the host film material. A hydrophilic melanin and polarization element (dichroic dyes or iodine crystal) are incorporated into the PVA film by means of absorption. In a typical process to make a high quality polarizing film such as that disclosed in U.S. Pat. No. 4,992,218, a PVA film (or partially stretched film) is soaked in an aqueous solution of dichroic dyes first. It is subsequently stretched substantially in one direction. The stretched film is then stabilized by immersing it in an aqueous solution containing a metallic ion and boric acid. The film is finally treated with heat. The absorption of melanin can happen before, during, or after the dichroic dye absorption.

OBJECTS AND SUMMARY OF THE INVENTION

An object of the present invention is to provide a melanin-containing polarizing laminate plate that has excellent polarizing ability, added HEV light absorption ability.

It is another objective of the invention to provide a melanin-containing polarizing laminate plate that has excellent optical quality.

Yet another objective of this invention to provide improved processes for producing a melanin-containing polarizing laminate plate. These processes should have industrial advantage.

The objective is accomplished by incorporating melanin dye into a layer that is different from the polarizing film in the laminate. The melanin-containing layer can be either an adhesive layer or an additional resin layer. The polarizing film is produced separately with current technology, and the melanin-containing layer is laminated to one side or both sides of the polarizing film. Preferably, the polarizing film and melanin-containing layer laminate is protected by transparent resin sheets.

The first technical aspect of this invention involves the use of hydrophobic melanin. A hydrophobic melanin is first combined with a hydrophobic polymer base, which can be an adhesive for the laminate or a thermoplastic resin. A melanin-containing film is then formed by means such as coating, solution casting, or hot-melt extrusion.

The second technical aspect of the invention involves the use of water-soluble hydrophilic melanin. A hydrophilic melanin can be incorporated into base polymer films such as PVA by absorption from an aqueous solution of melanin, or by coating/casting a film from an aqueous solution of melanin and PVA.

The polarizing film used in this invention is selected from the following group:
1) A polarizing film based on PVA film and absorbed iodine or dichroic dyes;
2) A polarizing film obtained by subjecting a polyvinyl alcohol-type film to a dehydration treatment to form a polyene, and orienting the treated film substantially in one direction;
3) A polarizing film based on a hydrophobic polymer film and water-insoluble dichroic dyes;
4) A polarizing film based on a liquid crystal polymer (LCP) film and water-insoluble dichroic dyes.

The melanin-containing polarizing plate according to the invention can be used in goggles, or incorporated into other plastic optical articles such as an ophthalmic lens through insert injection molding or resin casting methods.

DETAILED DESCRIPTION OF THE INVENTION

The melanin used in this invention for providing HEV blocking property can be either hydrophobic or hydrophilic (water-soluble). For the purpose of the present description, melanins are defined and classified as in the book entitled Melanins, by R. A. Nicolaus, published in 1968 by Hermann, 115, Boulevard Saint-Germain, Paris, France (hereinafter "Nicolaus") which work in its entirety is incorporated herein by reference. As defined by Nicolaus, melanins constitute a class of pigments which are widespread in the animal and vegetable kingdoms. Melanins are macromolecules consisting of mixtures of polymers that are highly conjugated in nature. The extensive degree of conjugation produces their unique transmittance spectrum. Melanins are highly irregular, three-dimensional polymers not only in the way monomeric units are linked together but in the nature of the units themselves. A typical melanin structure is shown in Arnaud, R., et al, Photochem Photobiol, Vol 38, page 161-168 (1983), Electron Spin Resonance of Melanin from Hair, Effects of Temperature, pH, and Light Irradiation. While the name melanin in Greek means black, not all melanins as pigments are black but may vary from brown to yellow.

General discussion of the properties and chemistries of melanins may be found in G. Prota, M. D'Ischia, A. Napolitano, The chemistry of melanins and related metabolites, in "The Pigmentary System", ed. J J Nordlund et al., Oxford University Press, 1988, and in Crippa, R.; Horak, V.; Prota, J.; Svoronos, P.; Wolfrom, L. "Chemistry of Melanins", in The Alkaloids, Brossi, A., Ed.; Academic Press: New York, 1989; vol. 36, chapter 6, pp. 253-323.

Melanins are classified in three groups, namely, eumelanins, phaeomelanins and allomelanins. Eumelanins are derived from the precursor tyrosine shown as compound (1):

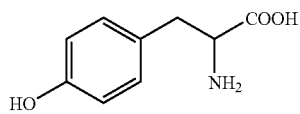
(1)

Phaeomelanins are derived from the precursors tyrosine or cysteine shown as compound (2):

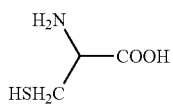
(2)

Allomelanins, the meaning of which is other melanins, are formed from nitrogen-free precursors, such as catechol. It is also believed that 1,8-dihydroxynapthalene may produce melanin through enzymatic oxidation. Further information on Melanins is found and incorporated herein by reference on page 827, Monograph No. 5629 in The Merck Index (10th Ed. 1983).

Melanin is produced in nature by the oxidative polymerization of the precursors. Furthermore, melanin may be synthesized commercially or in the laboratory from precursors through the free radical polymerization of these precursors. An example of the synthetically produced catechol melanin and DOPA melanin are found in the article by Froncisz, W., Sarna, T., Hyde, James S. Arch. Biochem. Biophys. "Copper (2+) ion Probe of Metal-ion Binding Sites in Melanin Using Electron Paramagnetic Resonance Spectroscopy." I. Synthetic Melanins. (1980, 202(1), 289-303). That article is incorporated herein by reference.

Additional information relative to the preparation of suitable water-soluble allomelanins may be found in U.S. Pat. Nos. 5,112,883 and 5,157,075 and are incorporated herein by reference.

Convenient synthesis of water-soluble hydrophilic eumelanins can be found in a series of U.S. Pat. Nos. 5,216,116, 5,218,079, 5,225,435, 5,227,459, 5,384,116, and 5,618,519, all of which are incorporated herein by reference.

Most of the natural and synthetic melanins are hydrophilic. In order to facilitate the uniform incorporation of melanin into a hydrophobic polymer base, modifications to the synthesis of melanin is needed. One method is to carry out the polymerization process in organic solvent, instead of water, with an organic peroxide initiator. That is, more hydrophobic melanin can be prepared in a way similar to conventional free-radical polymerization. At the end of the reaction, aggregates that do not dissolve in the solvent will be filtered out. The free-radical initiator is chosen by considering its solubility properties and the desired reaction kinetics. The most preferred free-radical initiator is benzoyl peroxide. Other preferred free-radical initiators are di-tert-butyl peroxide and di(1-cyano-1-methyl ethyl) diazene (azobisisobutyronitrile), azo compounds, redox pairs, photochemical systems, perborates, percarbonates and radiation. The solvents that may be used, include dimethyl sulfoxide (DMSO), chloroform, toluene, acetonitrile, methylene chloride, 1,2-dichloroethane, alcohols, glycol, etc. Suitable melanin precursors include but are not limited to tyrosine, 3,4-dihydroxy phenylalanine (dopa), D-dopa, catechol, 5-hydroxyindole, tyramine, dopamine, m-aminophenol, o-aminophenol, p-aminophenol, 4-aminocatechol, 2-hydroxyl-1,4-naphthaquinone (henna), 4-methyl catechol, 3,4-dihydroxybenzylamine, 3,4-dihydroxybenzoic acid, 1,2-dihydroxynaphthalene, gallic acid, resorcinol, 2-chloroaniline, p-chloroanisole, 2-amino-p-cresol, 4,5-dihydroxynaphthalene 2,7-disulfonic acid, o-cresol, m-cresol, p-cresol, and other related substances which are capable of being oxidized to tan, brown, or black melanin-like compounds capable of absorbing ultraviolet. Combinations of precursors can also be used.

Hydrophobic moieties can be introduced into melanin molecules to make a melanin more hydrophobic. Common reactive reagents include aliphatic acid chlorides, acid anhydrides, carbodiimides. Reactions are carried out in inert organic solvents such as methylene dichloride, nitroethane, nirobenzene, etc. Melanin modified with a polyethylene glycol derivative is disclosed in U.S. Pat. No. 5,157,075. It is incorporated herein by reference.

This invention is directed to the use of any melanin regardless of its source or method of preparation, as long as a uniform melanin-containing polymeric film can be formed with optical quality. Depending on the nature of the base polymeric material, either hydrophilic or hydrophobic melanin can be used. Eumelanine type of melanin is preferred over the other two types of melanin.

There are at least four types of polarizing film that can be used to realize the polarization function in a melanin-containing polarizing plate of this invention:

1) A polarizing film based on PVA film and absorbed iodine or dichroic dyes;

2) A polarizing film obtained by subjecting a polyvinyl alcohol-type film to a dehydration treatment to form a polyene, and orienting the treated film substantially in one direction;

3) A polarizing film based on a hydrophobic polymer film and water-insoluble dichroic dyes;

4) A polarizing film based on a liquid crystal polymer (LCP) film and water-insoluble dichroic dyes.

The polarizing thin layer is a film transmitting only a light having a wave front of a specific direction. The typical polarizing film comprises a uniaxially stretched film comprising PVA or derivative thereof having absorbed iodine or dichroic dyes as the polarizing element. From the standpoint of polarization characteristics and heat resistance, dichroic dye polarizing sheets are preferred in this invention. There are numerous patents that describe the manufacturing of PVA based polarizing films with dichroic dyes as polarizing elements. Representative examples include U.S. Pat. Nos. 4,564,545, 4,774,141, 4,859,039, 4,992,218, 5,071,234, which are incorporated herein by reference.

In general, a PVA type film, preferably 0.05 to 0.1 mm thick, is soaked in an aqueous solution of selected dichroic dyes at a temperature of 30~60 degrees C. to dye it. Then, if necessary, the PVA type film is subjected to boric acid treatment and dried. In order to afford polarizing function, the film is stretched uniaxially up to a length of 2 or more times its original length, particularly preferably to a length of 2.5-4 times before dyeing, after dyeing or during dyeing.

Examples of the dichroic substances (particularly dichroic dye) used to impart polarizing property to the polymeric film include Chlorantine Fast Red (C. I. 28160), Chrysophenine (C. I. 24895), Sirius Yellow (C. I. 29000), Benzopurpurine (C. I. 23500), Direct Fast Red (C. I. 23630), Brilliant Blue 6B (C. I. 24410), Chlorazol Black BH (C. I. 22590), Direct Blue 2B (C. I. 22610), Direct Sky Blue (C. I. 24400), Diamine Green (C. I. 30295), Congo Red (C. I. 22120), and Acid Black (C. I. 20470).

A usable polyene polarizing sheet is disclosed in U.S. Pat. No. 5,666,223 as a K-sheet type polarizer. It is incorporated herein by reference. The K-sheet is a light polarizer sheet comprising a molecularly oriented sheet of polyvinylalcohol/polyvinylene block copolymer material having the polyvinylene blocks thereof formed by molecular dehydration of a sheet of polyvinylalcohol. The molecularly oriented sheet of polyvinylalcohol/polyvinylene block copolymer material comprises a uniform distribution of light-polarizing molecules of polyvinylalcohol/polyvinylene block copolymer material varying in the length (n) of the conjugated repeating vinylene unit of the polyvinylene block of the copolymer throughout the range of from 2 to 24. The sheet is stretched prior to, subsequent to, or during the dehydration step with the result that the light-polarizing molecules become oriented, and such that the degree of orientation of said molecules increases throughout said range with increasing length (n) of said polyvinylene blocks. Further, the concentration of each of the polyvinylene blocks remains comparatively constant (i.e., "balanced") through 200 nm to 700 nm, thus providing balanced polarization.

A hydrophobic polymer based polarizing film can be obtained, in general, blending a hydrophobic resin with a hydrophobic dichroic dye, then forming a film by molten casting, solution casting, or extrusion, followed by uniaxially stretching the film to orient the dye. Preferred hydrophobic polymers include halogenated vinyl polymer resins, acrylic resins, polyolefin resins, polyamide resins, polyimide resins, polyester resins, polycarbonate resins, polyether-sulfone resins and the like. More preferred are resins which contain at least 80 percent by weight of aromatic polyester resin components (such as polyethylene terephthalate, polyethylene naphthalate, polybutylene terephthalate and the like), polyimide resins, polyethersulfone resins, and polycarbonate resins which have excellent thermal resistance, moisture resistance, transparency, and stable birefringence after orientation.

In order to obtain a hydrophobic polymer based polarizing film that has a desired color and particularly a neutral gray color, it is preferable to blend a number of hydrophobic dichroic dyes into the base polymer. Furthermore, non-dichroic dyes may be used to correct the color if necessary.

A hydrophobic polymer based polarizing film can be made by melting the base polymer together with dichroic dyes of choice, and other colorants added as desired, forming the colored molten polymer into a film or sheet, stretching it longitudinally or transversely at a temperature close to its glass transition temperature with a stretch ratio of 3 to 10, and then heat-treating it at a temperature of 100 to 250 degrees C. for a period of time ranging from 1 second to 30 minutes. Although the just described unidirectional stretching may be adequate, the mechanical strength of the film can further be enhanced, if desired, by stretching it with a stretch ratio of about 1.1 to 2 in the direction perpendicular to the principal stretching direction.

A liquid crystalline polymer (LCP) based polarizing film can be made similarly as a hydrophobic polymer based polarizing film by replacing the base polymer with the LCP, except that no stretch is needed. The LCP may be a polyester, a polyamide, a polycarbonate, a poly(ester-carbonate), polyaramide, poly(ester-amide), and the like. Example LCPs suitable for polarizing film can be found in U.S. Pat. Nos. 5,738,803 and 5,746,949. These disclosures are incorporated by reference herein.

Water-insoluble dichroic dyes commonly used to impart polarizing property to a hydrophobic polymeric film or a LCP film include vat dyes and organic pigments, quinonic dyes, pyrelene dyes, diazo dyes. There are a variety of patents that describe useful hydrophobic organic dichroic dyes. The following U.S. patents are enclosed and their disclosures are incorporated by reference as if fully set forth herein: U.S. Pat. Nos. 4,803,014, 4,824,882, 4,895,677, 4,921,949, 5,059,356, 5,286,418, 5,354,513.

According to the present invention, the melanin and polarizing element each exist in separate film layers. There may be one melanin layer on one side or two melanin layers on both sides of the polarizing film. Depending on the base (host) material for the polarizing film and the melanin layer, they may preferably be protected and supported by other transparent resin sheet layers. When incorporating a melanin-containing polarizing plate into an optical article, the protective layer will face out and the support layer will be bonded to the body of the optical article such as an ophthalmic or sunscreen lens.

In order to achieve high optical quality and eliminate interference fringe colors, the protective layer needs to be either optically isotropic or uniformly oriented by stretching to have a retardation value of greater than 3,000 nm. Optically isotropic or low birefringent thermoplastic resins include cellulose esters, norbornene resins (polycycloolefin), polyacrylates. Cellulose esters and polycycloolefins are preferred in view of optical isotropic properties and minimum introduction of birefringence during forming of the polarizing plate into the desired shape. Cellulose acetate butyrate (CAB) is especially preferred in view of forming compatibility with thermoplastic support layer resin such as polycarbonate. Commercial available cellulose ester film products include Kodacel® of Eastman Kodak Co., Fuji Tack Clear of Fuji Photo Film Co., Konicatac of Konica.

With respect to the second type of thermoplastic protective layer having retardation value of at least 3,000 nm, thermoplastic resins having stable birefringence after orientation is preferred. The typical thermoplastic resin example includes an aromatic polyester (homopolymer, copolymer, or blending), a polycarbonate, a polyacrylate, a polysulfone, or a blend of thermoplastic resins such as a polyester and a polycarbonate. Of these, aromatic polyester such as polyethylene naphthalate (PET) or polyethylene naphthalate (PEN), and blending of polycarbonate with a polyester of high glass transition temperature are preferred in view of forming compatibility with polycarbonate.

In the present invention, the retardation value (R, nm) is defined by the following equation.

$$R = \Delta n \cdot d$$

wherein $\Delta n$ is the birefringence of the thermoplastic protective layer, and d is the thickness (nm) of the layer. The retardation value (R) of the thermoplastic sheet used in this invention as the protective layer is at least 3,000 nm, preferably at least 4,000 nm, especially preferably at least 5,000 nm. There is no particular upper limit, and generally, the upper limit is not more than 20,000 nm. If a thermoplastic sheet having an R value of less than 3,000 nm is used, a colored interference fringe tends to occur in the polarizing plate, especially after the plate is formed or molded into a shape (e.g., spherical curve) for incorporating in an optical article.

A thermoplastic sheet having the above retardation value in this invention for the protective layer can be produced by forming a sheet from an aforementioned thermoplastic resin by an ordinary extrusion method or casting method, and stretching the sheet substantially in one direction while heating it at a temperature slightly higher than its glass transition temperature. In constructing the polarizing plate of the invention, it is important to achieve substantially parallel alignment between the absorption axis of the polarizing film and a principle index of refraction of the protective layer. Such an alignment reduces polarization efficiency losses.

Suitable thickness for the protective layer in this invention is between 0.02 mm to 1.3 mm, and preferably 0.1 mm to 0.8 mm.

With respect to the thermoplastic support layer, it is not necessary to have a specially treated thermoplastic sheet, such as oriented to a certain retardation value, in order to incorporate it on a plastic eyewear article and to provide excellent optical quality, such as free of interference fringe colors when viewed with the protective layer facing the polarizing source. Although the support layer in this invention can be made from any optical grade thermoplastic sheet, it is desired, though, for the thermoplastic layer to be made from the same or similar material as the eyewear article base so that the polarizing plate can be thermally integrated with the article base body through a process such as injection molding. It is also desired that the thermoplastic layer resin has similar physical properties (e.g., similar glass transition temperature) to the selected resin for the protective layer in view of providing better forming compatibility. Preferred resins for the thermoplastic support layer include polycarbonate, polyimide, polyamide, polyurethane, polycyclicolefin or cyclic olefin copolymer. Considering most of molded polarized eyewear articles are based on polycarbonate, a thermoplastic support layer made from a polycarbonate sheet is more preferred. A typical polycarbonate based resin is polybisphenol-A carbonate. In addition, examples of the polycarbonate based resin include homopolycarbonate such as 1,1'-dihydroxydiphenyl-phenylmethylmethane, 1,1'-dihydroxydiphenyl-diphenylmethane, 1,1'-dihydroxy-3,3'-dimethyldiphenyl-2,2-propane, their mutual copolymer polycarbonate and copolymer polycarbonate with bisphenol-A. Examples of optical grade polycarbonate include GE Lexan©, Bayer Makrolon©, and Teijin Panlite©. Theses extruded sheets (or films) usually have a retardation value between 100 nm and 1000 nm.

The thermoplastic support layer of the invention has a thickness comparable to the thermoplastic protective layer, of preferably 0.02 mm to 1.3 mm, and more preferably 0.1 mm to 0.8 mm.

An adhesive is used to bond the thermoplastic protective layer and the thermoplastic support layer to the polarizing film or the melanin layer, and to bond the melanin layer to the polarizing film if needed. For adhering a thermoplastic sheet to a PVA based or a K-sheet polarizing film, the adhesive includes a urethane type adhesive, a polyvinyl alcohol adhesive such as polyvinyl alcohol or polyvinyl butyral, and a vinyl latex adhesive such as butyl acrylate. A urethane type adhesive can also used for hydrophobic polymer based polarizing film. For a LCP polarizing film, it is usually hard to bond the thermoplastic sheet layers to the LCP film. Hot melt adhesives such as the ADMER adhesive by Mitsui Petrochemical, Japan is needed. In order to have a still better adhesion between the thermoplastic sheet layer and the polarizing film, pre-treatment to the polarizing film surface and the thermoplastic sheet surface by methods commonly known to those skilled in the art is desired. Pre-treatment can be done by chemical corrosion such as treating with alkyl solution or by plasma discharge such as corona.

A protective sheet layer is optional, although preferred. It is not a must to have a protective layer for PET PZ and k-sheet. A support sheet layer is optional, although preferred.

According to a first embodiment of the present invention, a melanin-containing polarizing plate is made of a hydrophobic (water-insoluble) melanin and any one of the four types of polarizing film. The melanin is dissolved in a hydrophobic base material to form a melanin-containing film to be bonded to one or both sides of the polarizing film.

In one embodiment of the first aspect of the present invention, melanin is dissolved in a hydrophobic thermoplastic resin through hot mixing. A film is then formed by extrusion or hot-press. Depending on the light transmission requirement and the final film thickness, the concentration of melanin can range from 0.1% to 3% by weight. Suitable thermoplastic resins include polycarbonates, polyacrylates, cellulose esters, polyurethanes, polyesters, polysulfones, etc. If the film is sufficiently thick, preferably between 0.1 mm to 1.0 mm, it can act as the support layer to be directly bonded to the body of the optical article. The same material of the optical article body is preferred for the melanin-containing film. For instance, if the melanin-containing polarizing plate will be incorporated on a polycarbonate ophthalmic or sunscreen lens, a polycarbonate melanin film is preferred. A special polycarbonate material designed to take melanin is described in U.S. Pat. No. 6,103,777. It is incorporated herein by reference.

A melanin-containing thermoplastic film can also act as the protective layer for the polarizing film. In this case, an optically isotropic base material such as a cellulose ester or a highly birefringent material such as polycarbonate is preferred to host the melanin in order to avoid interfering fringe colors from polarized light and the reduction of polarizing efficiency. An extruded polycarbonate melanin film is stretched under temperature close to its glass transition point to give a uniform birefringence and a retardation value of at least 3,000 nm.

Another method of incorporating melanin into a hydrophobic thermoplastic resin is by dissolving it into a common organic solvent. The solid concentration is preferably higher than 15% by weight, more preferably higher than 25%. Melanin-containing thermoplastic film is formed by casting the solution on a release liner and drying. Films prepared in this way are usually thinner than 5 mm. Additional protective and support layers are needed to laminate a melanin-containing polarizing plate.

It may be possible to directly cast the solution on the thermoplastic resin sheet used to form the protective or support layer if the solvent does not seriously attack the thermoplastic resin to cause haze. At the same time, the cast film is solvent-welded onto the resin sheet.

Thermoplastic polyurethane is a special host material for melanin. melanin-containing polyurethane film may be prepared through extrusion of pre-mixed melanin-containing polyurethane or solution casting on a release liner or direct casting on the support or protective thermoplastic resin sheet. A thermoplastic melanin-containing polyurethane layer is capable to bond the resin sheet to the polarizing film though press- or hot-lamination. Polyurethanes polymerized from aliphatic or aromatic diisocyanates and polyols including polyester, polyether, polycarbonate are all suitable, although aliphatic polyester polyurethane is preferred considering better optical properties, adhesion, and stability. The hardness of the thermoplastic polyurethane is usually less than 55 shore-D, preferably between 70 to 95 shore-A. The softening point should be low enough so that good adhesion is provided when laminating at a temperature lower than 130 C.

In another embodiment of present invention, hydrophobic melanin is incorporated into a liquid adhesive, then cured into melanin-containing layer. The adhesive is used to bond the protective and support sheets to the polarizing film. The adhesive may either be radiation curable or thermally curable. An inert organic solvent may be used to assist the incorporation.

In a preferred embodiment, hydrophobic melanin such as those modified with ethylene glycol is dissolved in the polyol component of a 2-part polyurethane adhesive. The adhesive is then used to laminate the polarizing film of choice to the thermoplastic resin support layer or the thermoplastic resin protective layer. In case the solubility of the melanin in the adhesive is limited, minimum amount of inner organic solvent can be used to assist the dissolving process. In addition, the melanin-containing adhesive can be applied to both sides of the polarizing film so that the same HEV cut-off effect can be achieved with half of the melanin concentration.

In the second technical aspect of this invention, a melanin-containing polarizing plate is made of a hydrophilic (water-soluble) melanin and any one of the four types of polarizing film. A polarizing film based on PVA is preferred considering the compatibility between the polarizing film and the melanin-containing hydrophilic film.

One embodiment in the second aspect of this invention utilizes a hydrophilic melanin-containing PVA film. A PVA film, preferably 0.05 to 0.1 mm thick, is immersed in an aqueous solution of melanin at a temperature between 30 to 60° C. for up to 15 minutes. The solution is kept at neutral or weak basic. The melanin concentration is between 0.5% to 10% by weight, more preferably between 1% to 5%. The PVA film is preferably under tension during the period of immersion to achieve a uniform absorption of melanin and a flat film. The stretch under tension is not necessarily as high as that for preparing PVA based polarizing film. A stretch ratio from slightly over 1 to 4 is satisfying. After the absorption is done, the PVA film is rinsed with water and dried under heat of 110° C. for up to 20 minutes.

Another embodiment in the second aspect of this invention calls for a hydrophilic melanin-containing PVA type film prepared by solution casting or extrusion similar to the way that hydrophobic melanin is incorporated into a hydrophobic polymer. Water or blend of water and an alcohol such as ethanol is used as the solvent for solution casting. U.S. Pat. No. 5,326,507 disclosed a process to manufacture PVA based dichroic dye polarizing film through solution casting or extrusion. It is incorporated herein by reference.

In both embodiments aforementioned, an adhesive is needed to bond the melanin-containing hydrophilic film to the polarizing film. The adhesive includes a urethane type adhesive, a polyvinyl alcohol adhesive such as polyvinyl alcohol or polyvinyl butyral, and a vinyl latex adhesive, a vinyl acetate based adhesive. The thickness of the adhesive is usually 1 to 100 micrometers.

In either aspect of this invention, the amount of melanin loaded in a melanin-containing polarizing plate is determined by the desired HEV cut off, color, and overall light transmission. It is desirable to have an increased HEV cut-off between 400 and 500. Desirable colors are gray and brown (amber). Visible light transmission of the melanin-containing polarizing plate is between 15% to 35%.

The melanin-containing polarizing plate of this invention can be used as-formed in goggles. To incorporate the plate into other type of plastic optical articles such as eyewear lenses, it is usually formed to have a curved wafer having spherical surface. The wafer can then be integrated with the lens base material by insert casting in case of casting resin like CR-39 as describe in U.S. Pat. No. 5,286,419, or by insert injection molding in case of polycarbonate as described in U.S. Pat. No. 6,328,446.

EXAMPLES

The present invention will now be described in more detail in reference to examples, which are for illustration purpose only and should not be construed as a limitation upon the scope of the invention in any way.

The transmission spectrum, total visible light transmission (TLT) for a given film are measured using Hunter Lab UltraScan spectrophotometer.

Example 1

PUM-01

A thermoplastic polyurethane (Thermedics CLC-93A-V, 90 shore A) is dissolved in THF to give a 20% polyurethane solution by weight. A hydrophobic melanin (Photoprotective Technology, 10-100, brown) is then added into the solution to make a melanin loading of 2 part per 100 parts of polyurethane.

The melanin-containing polyurethane solution is cast on 15 mil optical grade polycarbonate film (GE, DSF-851) at room temperature. The cast film is allowed to settle for 10 minutes before it is heated up to 50 C. for 15 minutes and to 110 C. for another 10 minutes to form a melanin-containing polyurethane film-support film composite. The polyurethane film is 2 mil thick.

A gray PVA polarizing film based on dichroic dyes (MGC) is laminated with a 14 mil oriented polycarbonate film (retardation=5,000 nm) with a Loctite U-10FLurethane adhesive to form a polarizing film-protective film composite.

The above two composites are laminated together with a hot-roll laminator at 110 C. to yield a melanin-containing polarizing plate having the following structure: oriented polycarbonate protective layer-urethane adhesive layer-polarizing film layer-melanin-containing polyurethane layer-polycarbonate support layer. Its optical properties are measured and listed in Table 1.

Example 2

PCM-01

A polycarbonate (GE, DSF-851) is dissolved in dichloromethane to give a 15% solution by weight. A hydrophobic melanin (Photoprotective Technology, 10-100, brown) is then added into the solution to make a melanin loading of 0.9 parts per 100 parts of polycarbonate.

The polycarbonate melanin solution is cast on 15 mil optical grade polycarbonate film (GE, DSF-851) at 15° C. The cast film is allowed to settle and warmed to room temperature for 30 minutes to form a melanin polycarbonate film (2.2 mil thick)-support film composite.

The above composite film, a gray PVA polarizing film based on dichroic dyes (MGC), and a 14 mil oriented polycarbonate film (retardation=5,000 nm) are laminated together with a Loctite urethane adhesive to form a melanin-containing polarizing plate having the following structure: oriented polycarbonate protective layer-urethane adhesive layer-polarizing film layer-urethane adhesive layer-melanin polycarbonate layer-polycarbonate support layer. Its optical properties are measured and listed in Table 1.

Similar examples are contemplated wherein the melanin-containing polarizing plate has the following structure:

(1) oriented polycarbonate protective layer-urethane adhesive layer containing melanin-polarizing film layer (e.g., PVA-dichroic)-urethane adhesive layer containing melanin-polycarbonate support layer; and (2) oriented polycarbonate protective layer-polarizing film layer (e.g., PVA-dichroic)-PVA layer containing melanin-polycarbonate support layer.

TABLE 1

|  |  | Y | a* | b* | Polarization Efficiency | Melanin Layer Thickness (mil) |
|---|---|---|---|---|---|---|
| PUM-01 | Melanin + urethane/PZ | 12.99% | −1.06 | 7.58 | 99.9% | 2 |
| PCM-01 | Melanin + poly/PZ | 14.37% | −1.39 | 6.38 | 99.9% | 2.2 |

Wherein Y is indicative of light transmission, a* and b* are in accordance with CIELAB color maps.

It is thus demonstrated that a polarizing plate containing melanin not sharing the same host layer can be produced while still optimizing the attractive properties of melanin in an eye lens.

What is claimed is:

1. An optical element comprising:
   a polymer layer containing a polarizing agent; and
   a polyurethane melanin layer comprising one or more polyurethanes selected from the group of polyurethanes consisting of: polyester-based polyurethane, polyether-based polyurethane, and polycarbonate-based polyurethane;
   the polyurethane melanin layer disposed upon the polymer layer.

2. The optical element of claim 1, wherein the polyurethane melanin layer is adhesive.

3. The optical element of claim 1, wherein the polyurethane melanin layer is protective.

4. The optical element of claim 1, wherein the polyurethane melanin layer is supportive.

5. An optical lens comprising:
   a protective layer;
   an adhesive layer disposed upon the protective layer;
   a polarizing film layer disposed upon the adhesive layer;
   a polyurethane melanin layer disposed upon the polarizing film layer, the polyurethane melanin layer comprising one or more polyurethanes selected from the group of polyurethanes consisting of: polyester-based polyurethane, polyether-based polyurethane, and polycarbonate-based polyurethane; and
   a support layer disposed on the polyurethane melanin layer.

6. The optical lens of claim 5, wherein the polyurethane melanin layer bonds to the polarizing film layer through press- or thermal-lamination.

7. The optical lens of claim 5, wherein the polyurethane melanin layer is adhesive.

8. A method of making an optical lens comprising:
   creating a polymer layer containing a polarizing agent;
   creating a polyurethane melanin layer comprising one or more polyurethanes selected from the group of polyurethanes consisting of: polyester-based polyurethane, polyether-based polyurethane, and polycarbonate-based polyurethane; and
   adhering the polyurethane melanin layer to the polymer layer.

9. The method of claim 8, wherein the step of creating a polyurethane melanin layer comprises extruding a polyurethane melanin mix onto a release liner.

10. The method of claim 8, wherein the step of creating a polyurethane melanin layer comprises casting a polyurethane melanin mix upon a support layer.

11. The method of claim 8, wherein the step of creating a polyurethane melanin layer comprises casting a polyurethane melanin mix upon a protective layer.

12. The method of claim 8, wherein the step of creating a polyurethane melanin layer comprises incorporating a polyurethane melanin mix into a liquid adhesive.

13. The method of claim 8, wherein the step of creating a polyurethane melanin layer comprises incorporating a polyurethane melanin mix into a protective layer.

14. The method of claim 8, wherein the step of creating a polyurethane melanin layer comprises incorporating a polyurethane melanin mix into a support layer.

15. The method of claim 8, wherein the step of adhering the polyurethane melanin layer to the polymer layer comprises employing press-lamination.

16. The method of claim 8, wherein the step of adhering the polyurethane melanin layer to the polymer layer comprises employing thermal-lamination.

17. The method of claim 8, wherein the step of adhering the polyurethane melanin layer to the polymer layer comprises employing one or more adhesives selected from the group of adhesives consisting of: urethane adhesives, polyvinyl alcohol adhesives, and vinyl latex adhesives.

* * * * *